US011004601B2

(12) United States Patent
Kirsch et al.

(10) Patent No.: US 11,004,601 B2
(45) Date of Patent: May 11, 2021

(54) FORMING METHOD FOR PRODUCING A COMPOSITE PART HAVING A PERMANENT MAGNET

(71) Applicant: PREH GMBH, Bad Neustadt a. d. Saale (DE)

(72) Inventors: René Kirsch, Erbenhausen (DE); Kai Lang, Bastheim (DE)

(73) Assignee: PREH GMBH

( * ) Notice: Subject to any disclaimer, the term of this patent is extended or adjusted under 35 U.S.C. 154(b) by 403 days.

(21) Appl. No.: 15/905,189

(22) Filed: Feb. 26, 2018

(65) Prior Publication Data
US 2018/0261386 A1 Sep. 13, 2018

(30) Foreign Application Priority Data

Mar. 8, 2017 (DE) ...................... 10 2017 104 895.2

(51) Int. Cl.
*H01F 41/02* (2006.01)
*H01F 7/02* (2006.01)
*B29C 45/14* (2006.01)

(52) U.S. Cl.
CPC ... *H01F 41/0266* (2013.01); *B29C 45/14336* (2013.01); *B29C 45/14377* (2013.01); *B29C 45/14778* (2013.01); *B29C 45/14836* (2013.01); *H01F 7/02* (2013.01); *H01F 7/0221* (2013.01); *H01F 41/026* (2013.01); *B29K 2995/0008* (2013.01); *B29K 2995/0013* (2013.01); *B29K 2995/0015* (2013.01)

(58) Field of Classification Search
CPC ........ B29C 45/14336; B29C 45/14377; B29C 45/14778; B29C 45/14836; B29K 2995/0008; B29K 2995/0015; B29K 2995/0013; H01F 41/0266; H01F 7/02; H01F 41/026; H01F 7/0221
See application file for complete search history.

(56) References Cited

U.S. PATENT DOCUMENTS 4,638,281 A * 1/1987 Baermann .......... G03G 15/0921
29/607

FOREIGN PATENT DOCUMENTS

DE 102004010126 A1 9/2004
DE 102006056799 A1 6/2008
DE 102007036264 A1 2/2009

* cited by examiner

*Primary Examiner* — Bernard Rojas
(74) *Attorney, Agent, or Firm* — M&B IP Analysts, LLC

(57) ABSTRACT

The present disclosure relates to a forming method for producing a composite part for an operating member, the method comprising the steps: disposing at least one permanent magnet in an injection-molding tool, which defines a mold cavity, and a heat-conducting reinforcement, which extends along the permanent magnet and is in touching contact with the injection-molding tool, in each case at a predefined position of the mold cavity; overmolding the permanent magnet with molding material by introducing molding material into the mold cavity; forming the composite part having the at least one permanent magnet, the heat-conducting reinforcement and the molding material.

19 Claims, 4 Drawing Sheets

FORMING METHOD FOR PRODUCING A COMPOSITE PART HAVING A PERMANENT MAGNET

This application claims priority to the German Application No. 102017104895.2, filed Mar. 8, 2017, now pending, the contents of which are hereby incorporated by reference.

The present disclosure relates to a forming method for producing a composite part for an operating member, a composite part produced in accordance with the method and an operating member having the composite part. The composite part has a permanent magnet which has become a constituent part of the composite part after being positioned and overmolded with a molding material, such as a thermoplastic material.

Injection molding is an extremely economical and versatile production method in plastics processing. Molded articles that can be used commercially right away and are often inexpensively manufactured in a single working step can be produced in large numbers with this method. Subsequent processing of the molded articles is mostly no longer required. Since injection molding tools are costly, injection molding, however, is worthwhile only when manufacturing mass-produced parts, e.g. mass-produced parts for the automobile industry. Overmolding components, such as a permanent magnet, affords a frequently used method in the manufacture of molded articles, with the finished molded article also being referred to as a composite part. Overmolding achieves an exact positioning accuracy of the permanent magnet in the composite part and, in the end, a precise function of the operating member.

When overmolding components, the component is inserted into the so-called mold cavity. The injection molding tool, which is responsible for receiving and distributing the molding material and ejecting the composite part, comprises a nozzle end and an ejector end separated by a separating plane. Using the injection machine nozzle, the molding material is injected into the tool through a sprue bushing and is distributed in the mold cavity in which the permanent magnet is situated. A composite part comprising the overmolded permanent magnet which is discharged on the ejector end of the tool is produced by this process. When overmolding a component, such as the permanent magnet, in a mold cavity, the former has to be fixed in the mold cavity, which is most frequently done by means of projecting retaining lugs or pins that generally rest against the future outer contour. One drawback of overmolding permanent magnets with the liquid and thus generally very hot mold material is the heating of the permanent magnet, and thus the imminent danger of the permanent magnet(s) losing their magnetization if heated up to or even above the Curie temperature. Particularly strong magnets, especially magnetic alloys with rear earths, e.g. NdFeB, have relatively low Curie temperatures. Therefore, these magnets must not be heated too much. It may be possible to restore the magnetization by means of an external magnetic field, which, however, necessitates an additional processing step and entails the risk that the predefined magnetic strength is not necessarily generated and thus the predetermined function of the operating member is not ensured. Thus, the permanent magnets were so far inserted into the molded article, for example glued to it, subsequent to the injection process. However, this connection is not reliable and leaves room for improvement with respect to the lack of positioning accuracy.

Against this background, there was a need for a solution for a forming method for producing a composite part, which contains at least one permanent magnet, for an operating member which, if possible, does not affect the magnetic properties of the permanent magnet and, in particular, can be implemented in a cost-effective manner. This object is achieved by means of a method according to claim 1. An equally advantageous operating member is the subject matter of the independent claim. Advantageous embodiments are in each case the subject matter of the dependent claims. It must be noted that the features cited individually in the claims can be combined with each other in any technologically meaningful manner and represent other embodiments of the present disclosure. The description, in particular in connection with the figures, additionally characterizes and specifies the present disclosure.

The present disclosure relates to a method for producing a composite part for an operating member, the method comprising the following steps. In a first step, at least one permanent magnet is disposed in an injection-molding tool, which defines a mold cavity, at a predefined position in the mold cavity, e.g. in the ejector end of the injection-molding tool, and a heat-conducting reinforcement is disposed in the mold cavity at a predefined position, wherein the heat-conducting reinforcement is disposed so as to extend along the permanent magnet and a touching contact between the heat-conducting reinforcement and the injection-molding tool is established.

In a subsequent step, the permanent magnet is overmolded with molding material by the molding material being introduced into the mold cavity, e.g. by injection. Molding material is understood to be powdery or granular plastic products which form the starting products for forming and can be chiplessly formed into molded articles by means of pressure within a certain temperature range. Mold materials also contain binding agents (e.g. phenolic resins, aminoplastics), filling and reinforcing substances (e.g. glass, carbon and boron fibers, chalk, talc, powdered stone, quartz powder, wood powder, metal powder, carbon black, pulp) and other additives (e.g. colorants, lubricants). Preferably, they are non-curable thermoplastic molding materials (thermoplastics), can be melted, and are most frequently provided in the form of powders or granules. For example, they are one or more polyolefins, such as polyethylene (PE) and polypropylene (PP), polystyrene (PS) and the impact-resistant copolymers of styrene with butadiene (SB), acrylonitrile (SAN) or acrylonitrile-butadiene (ABS), polyvinylchloride (PVC), poly(methyl methacrylate) (PMMA), polyamide (PA), polyacetal (polyoxymethylene, POM), linear polyurethane (PUR), polyethylene terephthalate (PETP), polybutylene terephthalate (PBT) and polycarbonate (PC) and cellulose ester, e.g. cellulose acetate (CA) and acetobutyrate (CAB).

According to another preferred embodiment, a curable thermosetting molding material (thermodurs, duromers) is provided. These are mixtures of curable synthetic resins (binding agents) and filling and reinforcing substances (resin carriers). The binding agents are, inter alia, phenolic (PF) resins, urea (UF) resins, melamine (MF) resins, epoxy (EP) resins, unsaturated polyester (UP) resins; wood powder, pulp (as a powder or fiber), textile filaments, fabric pieces, powdered stone, mica, asbestos, glass fibers and plastic fibers, inter alia, serve as resin carriers. Together, the binding agent and the resin carrier determine the properties of the molding materials and the molded articles produced from them. When processed by injection molding into molded articles and thermosetting semi-finished products (e.g. laminates), the curable molding material is formed under heat and pressure and simultaneously cured by chemical conversion; the cured molding material cannot be melted again. The characterizing properties of the thermosetting molding materials (graded according to binding agent and resin carrier) in relation to thermoplastic materials are rigidity, surface hardness, flame retardancy and resistance against heat and solvents.

According to the present disclosure, it is provided that, during overmolding, a heat-conducting reinforcement, hereinafter also in short referred to as reinforcement, is provided so as to extend along the permanent magnet and is in touching contact with the injection-molding tool. According to the present disclosure, by overmolding with molding material, the composite part having the at least one permanent magnet, the heat-conducting reinforcement and the molding material is formed as the molding material solidifies. For example, the composite part is a carrier of the operating member or a handle means, such as a pivot lever, of the operating member.

With respect to the reinforcement, heat-conducting in the sense of the present disclosure is understood to mean a heat conductivity that is greater than that of the molding material and is, for example, greater than 0.1 W/(m×K). Preferably, the heat conductivity of the reinforcement is greater than that of the permanent magnet and is, for example, greater than 5 W/(m×K), preferably greater than 10 W/(m×K), most preferably greater than 20 W/(m×K), such as 45 W/(m×K). The heat-conducting reinforcement, which is in touching contact with the injection-molding tool, ensures an efficient heat dissipation from the area around the permanent magnet into the tool, which generally consists of a metallic material and thus has good heat conductivity, and which ensures an efficient heat dissipation during overmolding due to its low heat resistance. Due to the reinforcement, the permanent magnet is prevented from heating up, particularly to the temperature of the molding material. An adverse effect on the magnetization of the permanent magnet can thus be excluded.

A permanent magnet is understood to be a magnet consisting of a piece of a hard magnetic material, e.g. alloys of iron, cobalt, nickel or certain ferrites. For example, it is an aluminum-nickel-cobalt magnet. AlNiCo magnets consist of iron alloys with aluminum, nickel and cobalt as main elements of the alloy. For example, it is a magnet consisting of Bismanol, an alloy of bismuth, manganese and iron, or a samarium cobalt alloy with an iron content of 20 to 25%. Preferably, it is a permanent magnet consisting of hard magnetic ferrites. More preferably, the material of the permanent magnet is a neodymium-iron-boron alloy; neodymium-iron-boron (NdFeB) makes very strong magnets possible, at acceptable costs. Their disadvantage of low operating temperatures of 60-120° C. at most is solved by the method according to the present disclosure without an expensive addition of dysprosium.

According to a preferred embodiment, it is provided that the reinforcement is disposed adjacent to the permanent magnet, i.e. the reinforcement and the permanent magnet are in touching contact. An efficient heat dissipation from the permanent magnet is thus achieved, particularly for the case in which a large-surface contact between the permanent magnet and the molding material cannot be excluded.

According to another embodiment, a thermally insulating intermediate layer, in particular an adhesive layer, is provided between the heat-conducting reinforcement and the permanent magnet. The intermediate layer is advantageous in that it minimizes the heat input into the permanent magnet, particularly if the contact area between the permanent magnet and the filling material could already be reduced. The adhesive layer is advantageous in that the fixing and positioning of the permanent magnet directly on the injection-molding tool can be omitted and that it can instead be positioned and fixed to the injection-molding tool via the reinforcement.

According to a preferred variant, the permanent magnet is configured as a plate defining two main surfaces, and the heat-conducting reinforcement has two metal sheets each disposed so as to border on or adjoin one of the main surfaces of the permanent magnet. Preferably, the reinforcement, e.g. the metal sheets, consists of a soft magnetic material. Thus, the reinforcement at the same time serves for guiding the magnetic field and aligning the magnetic field, and thus carries out the function of a pole shoe.

Preferably, the pole direction of the permanent magnet is oriented perpendicularly to the main surfaces.

According to a preferred variant, the reinforcement and the permanent magnet are arranged in the injection mold such that a touching contact between the molding material and the permanent magnet is formed only in some portions, and a touching contact between the molding material and the reinforcement is formed only in some portions. For example, exposed areas of the permanent magnet and the reinforcement, i.e. areas not covered by the molding material, are provided after the composite part has been removed from the injection-molding tool.

In order to prevent the permanent magnet from heating up, a surface area of the permanent magnet in touching contact with the molding material preferably constitutes less than 10%, more preferably less than 7%, most preferably less than 5% of the former's total surface area.

According to a preferred variant of the method, it is provided that a surface area of the reinforcement in touching contact with the molding material constitutes less than 30%, preferably less than 20%, preferably less than 10% of the former's total surface area.

In order to ensure a more effective heat dissipation from the permanent magnet, the latter is preferably also disposed so as to form a touching surface with the injection-molding tool.

In order to counteract demolding from the finished composite part, which is thus already removed from the injection-molding tool, preferably in a direction perpendicular to the touching surface of the permanent magnet and/or the reinforcement, the reinforcement and/or the permanent magnet have an undercut and/or at least one through hole.

According to a preferred variant of the method according to the present disclosure, it is provided that the temperature of the injection-molding tool does not exceed the Curie temperature of the permanent magnet, preferably 100° C.

The present disclosure further relates to an operating member having a composite part. The term composite part means the integral combination of at least the following components: at least one permanent magnet, a heat-conducting reinforcement and a molding material. According to the present disclosure, it is provided that the heat-conducting reinforcement is disposed so as to extend along the permanent magnet, wherein the reinforcement and the permanent magnet are arranged in the composite part such that a touching contact between the molding material and the permanent magnet is formed only in some portions, and a touching contact between the molding material and the reinforcement is formed only in some portions. With respect to other aspects, such as the details of the molding material, reference is made to the above description. Preferably, the reinforcement consists of a soft magnetic material.

According to a preferred variant of the operating member, it is provided that a surface area of the permanent magnet in touching contact with the molding material constitutes less than 10%, more preferably less than 7%, most preferably less than 5% of the former's total surface area.

Preferably, a surface area of the reinforcement in touching contact with the molding material constitutes less than 30%, more preferably less than 20%, most preferably less than 10% of the former's total surface area.

In a preferred embodiment, an adhesive layer is provided between the reinforcement and the permanent magnet for additional fixation and insulation.

Preferably, the permanent magnet is disposed such that it forms a surface of the composite part and the heat-conducting reinforcement and/or the permanent magnet have an undercut in order to counteract a demolding from the composite part, preferably in a direction perpendicular to the surface.

The present disclosure is explained further with reference to the following figures. The Figures are to be understood only as examples and each merely represent a preferred embodiment. In the figures.

Figure 1:
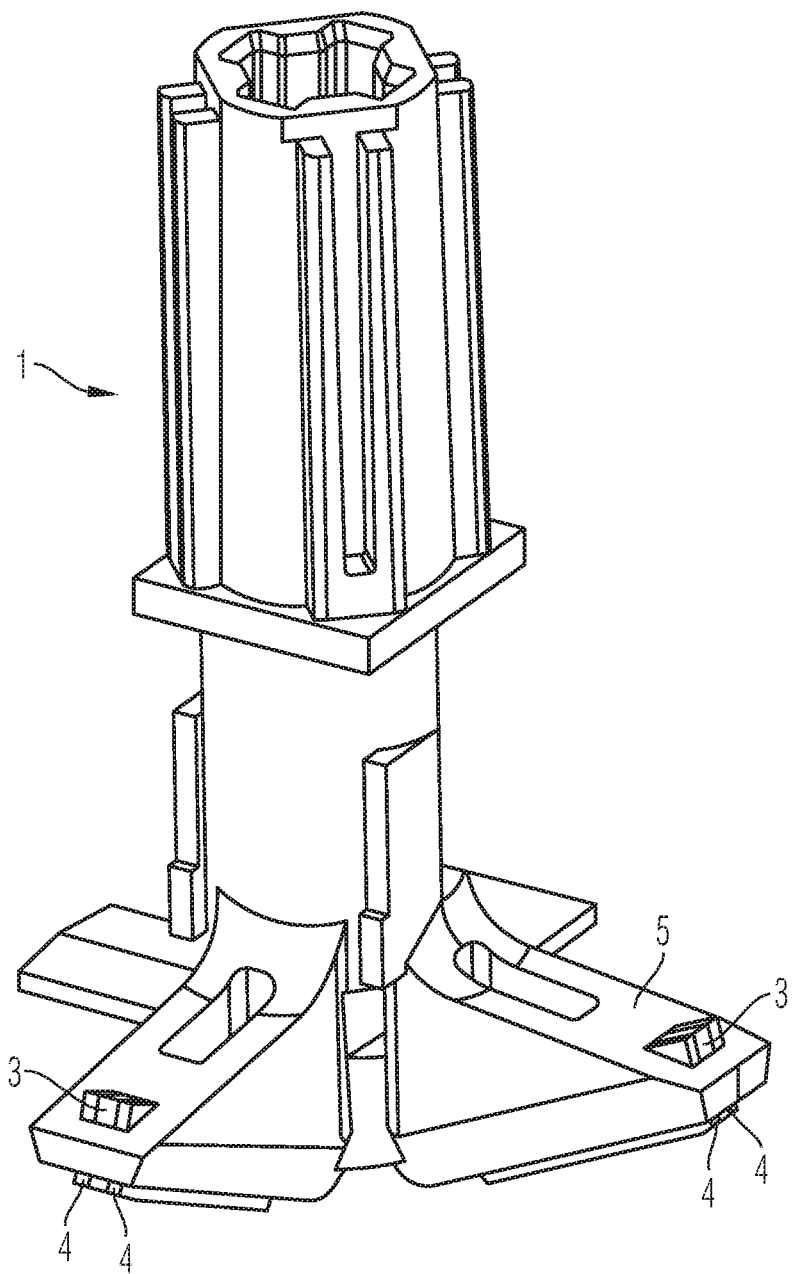
FIG. 1 shows a perspective view of a first composite part, which has been produced in accordance with the inventive method and is associated with an operating member.

The method according to the present disclosure is explained with reference to FIG. 1, which shows a first composite part 1, which has been produced according to the inventive method by overmolding with molding material 5 consisting of curable thermosetting material, and functions as a pivot lever in an operating member, wherein the restoring action and a latching feel are formed by the magnetic interaction of pairs of permanent magnets 3. The composite part 1 is formed by overmolding two permanent magnets 3 and associated metal sheets 4 forming a heat-conducting reinforcement for the permanent magnet 3. In each case, the permanent magnet 3 is configured in a plate-shaped manner and defines two main surfaces and four end faces, which have a small surface area compared to the main surfaces, and is in each case disposed, with associated metal sheets 4, in a lateral arm of the composite part 1. Adjacent to the main surfaces are provided the metal sheets 4 of soft magnetic material, which on the one hand serve for guiding and centering the magnetic field but are primarily provided to minimize the heat input into the temperature-sensitive permanent magnets 3 during the overmolding process with the hot molding material 5, by this heat being removed, due to the good heat conductivity of the metal sheets 4, via the latter into injection molding tool, which is not shown in FIG. 1 and is in touching contact with the metal sheets.

Figure 2:
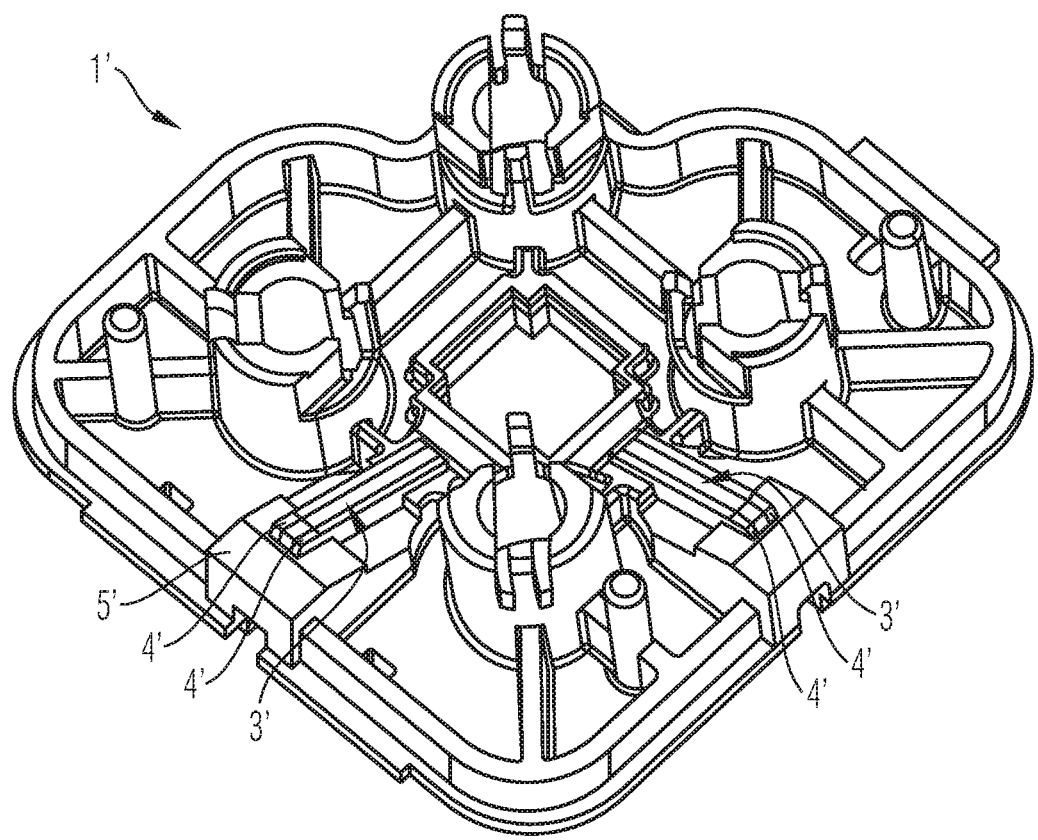
FIG. 2 shows a perspective view of a second composite part, which has been produced in accordance with the inventive method and is associated with an operating member.

FIG. 2 shows a second composite part 1' produced in accordance with the inventive method, which is configured for cooperation with the first composite part 1 of FIG. 1 in an operating member. Also in this case, the composite part 1' is formed by overmolding two permanent magnets 3' and associated metal sheets 4' forming a heat-conducting reinforcement of the permanent magnet 3'. Again, the permanent magnet 3' is in each case configured in a plate-shaped manner and defines two main surfaces and four end faces, which have a small surface area compared to the main surfaces, and is in each case disposed, with associated metal sheets 4', in the composite part 1' configured as a support. Adjacent to the main surfaces are provided the metal sheets 4' of soft magnetic material, which on the one hand serve for guiding and centering the magnetic field but are primarily provided to minimize the heat input into the temperature-sensitive permanent magnets 3' during the overmolding process with the hot molding material 5', by this heat being removed, due to the good heat conductivity of the metal sheets 4', via the latter into injection molding tool, which is not shown in FIG. 2 and is in touching contact with the metal sheets.

Figure 3:
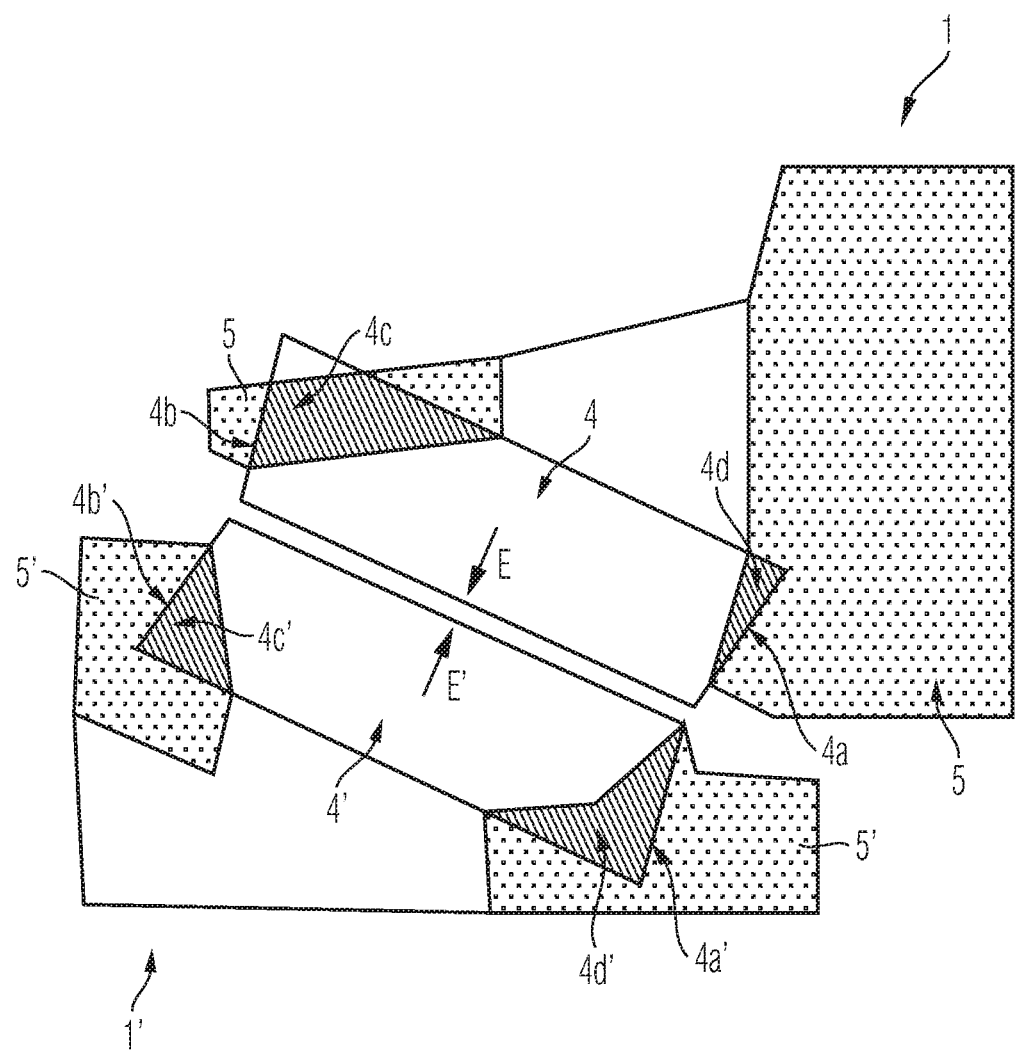
FIG. 3 shows another schematic sectional view of the operating member formed from the composite part of the FIGS. 1 and 2.

FIG. 3 shows the operating member formed of the composite parts 1 and 1' of the FIGS. 1 and 2, respectively. In this case, the composite part 1 configured and functioning as a pivot lever is disposed opposite to the composite part 1' functioning as a support in such a manner that, in a rest position shown in FIG. 3, the pairs of the permanent magnet on the side of the pivot lever and the permanent magnet on the side of the support, which are hidden in FIG. 3, and the associated metal sheets 4, 4' of the heat-conducting reinforcement are opposite from each other, spaced apart by a minimum distance. As is also made clear in FIG. 3, the metal sheets 4, 4' are provided with associated undercuts 4a or 4a' and 4b or 4b' in order to prevent a demolding of the metal sheets 4 or 4' from the molding material 5 or 5' in the direction of the arrows E, E', and thus in the direction of action of the permanent magnets. Furthermore, the touching contact of the metal sheets 4 and 4' with the respective molding material 5, 5', which is defined by the surfaces 4c and 4d or 4c' and 4d', is minimized to a fraction of the total surface area, whereas the permanent magnets, which are hidden in FIG. 3 and are therefore not shown, are in touching contact with the molding material 5 or 5' only at two end faces.

Figure 4:
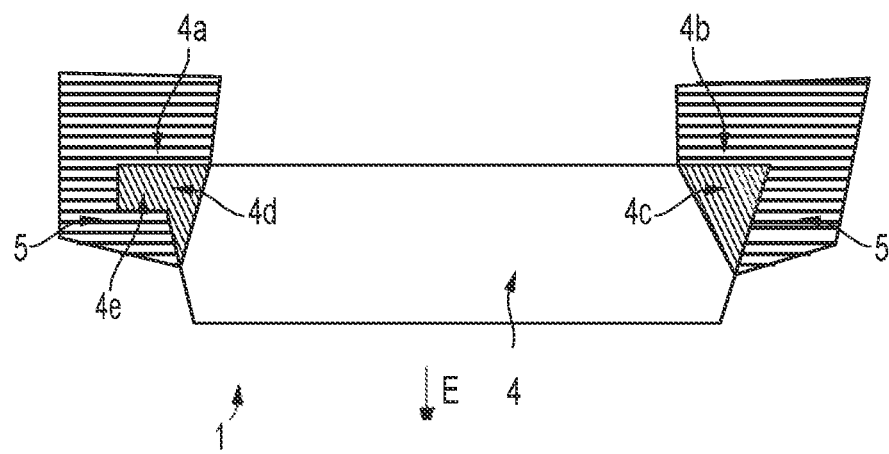
FIG. 4 shows a sectional view of another embodiment of the composite part produced in accordance with the inventive method.

FIG. 4 shows another embodiment of a composite part 1 produced in accordance with the present disclosure, which differs from the above-described embodiment merely by the configuration of the undercuts 4a and 4b provided for fixation in the molding material 5, due to them having an arm 4e that dips into the molding material 5.

Figure 5:
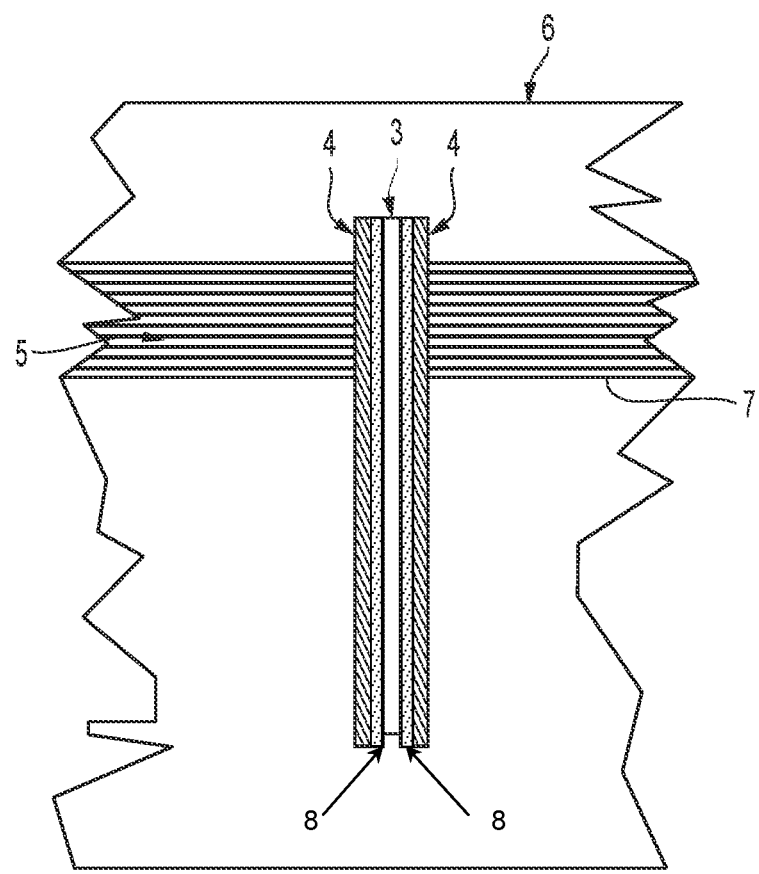
FIG. 5 shows a view of an injection-molding tool used in the method according to the present disclosure.

FIG. 5 shows the injection-molding tool 6 used in the overmolding process of the method according to the present disclosure. It has a mold cavity 7, also referred to as cavity, into which the hot molding material 5 enters the tool 6 under pressure via an injection machine nozzle that is not shown, in order to form the corresponding composite part in accordance with the mold cavity 7, after the molding material 5 has solidified. Prior to the injection of the molding material 5 in the above-mentioned overmolding step, in a step of arranging, at least one permanent magnet 3 is disposed in the mold cavity 7 of the injection-molding tool 6, and two heat conducting sheets 4 extending along the permanent magnet 3, which form said reinforcement, are disposed at a predefined position in the mold cavity 7. In the process, the metal sheets are in touching contact with the injection-molding tool 6, in order to minimize the heat input into the temperature-sensitive permanent magnet 3 during the overmolding process with the hot molding material 5, by this heat being removed, due to the good heat conductivity of the metal sheets 4, via the latter into injection molding tool 6.

Additionally, according to an embodiment, a thermally insulating intermediate layer 8, in particular an adhesive layer, is provided between the heat-conducting reinforcement 4 and the permanent magnet 3. The intermediate layer 8 is advantageous in that it minimizes the heat input into the permanent magnet 3, particularly if the contact area between the permanent magnet 3 and the filling material 4 could already be reduced. The intermediate layer 8, and in particular the adhesive layer is advantageous in that the fixing and positioning of the permanent magnet 3 directly on the injection-molding tool can be omitted and that it can instead be positioned and fixed to the injection-molding tool via the reinforcement 4.

The invention claimed is:

1. A forming method for producing a composite part for an operating member, the method comprising:
   disposing at least one permanent magnet in an injection-molding tool, which defines a mold cavity, and a heat-conducting reinforcement, which extends along the permanent magnet and is in touching contact with the injection-molding tool, in each case at a predefined position of the mold cavity;
   overmolding the permanent magnet with molding material by introducing molding material into the mold cavity;
   forming the composite part including the at least one permanent magnet, the heat-conducting reinforcement, and the molding material, wherein:
   the heat conductivity of the reinforcement is greater than that of the permanent magnet; and
   the permanent magnet is configured as a plate defining two main surfaces and the heat-conducting reinforcement has two metal sheets, each adjoining one of the main surfaces.

2. The method according to claim 1, wherein the heat-conducting reinforcement is disposed adjacent to the permanent magnet.

3. The method according to claim 1, wherein a thermally insulating intermediate layer is provided between the heat-conducting reinforcement and the permanent magnet.

4. The method according to claim 1, wherein the heat-conducting reinforcement is made from a soft magnetic material.

5. The method according to claim 1, wherein a pole direction of the permanent magnet is orientated perpendicularly to the main surfaces.

6. The method according to claim 1, wherein the heat-conducting reinforcement and the permanent magnet are arranged in the mold cavity such that a touching contact between the molding material and the permanent magnet is formed only in some portions, and a touching contact between the molding material and the heat-conducting reinforcement is formed only in some portions.

7. The method according to claim 6, wherein a surface area of the permanent magnet in touching contact with the molding material constitutes less than 10% of the permanent magnet's total surface area.

8. The method according to claim 7, wherein a surface area of the reinforcement in touching contact with the molding material constitutes less than 30% of the permanent magnet's total surface area.

9. The method according to claim 1, wherein the permanent magnet is disposed such that it forms a touching surface with the injection-molding tool.

10. The method according to claim 1, wherein the reinforcement or the permanent magnet have an undercut or at least one through hole in order to counteract a demolding from the composite part.

11. The method according to claim 1, wherein the molding material is a non-curable thermoplastic or a curable thermosetting molding material.

12. The method according to claim 1, wherein the temperature of the injection-molding tool does not exceed a Curie temperature of the permanent magnet.

13. An operating member having at least a composite part, the composite part comprising:
   a permanent magnet;
   a heat-conducting reinforcement; and
   a molding material, wherein:
   the heat-conducting reinforcement is disposed so as to extend along the permanent magnet;
   the heat-conducting reinforcement and the permanent magnet are arranged in the composite part such that a touching contact between the molding material and the permanent magnet is formed only in some portions, and a touching contact between the molding material and the heat-conducting reinforcement is formed only in some portions;
   the heat conductivity of the reinforcement is greater than that of the permanent magnet; and
   the heat-conducting reinforcement has two sheets, each of the sheets adjoining opposite sides of the permanent magnet.

14. The operating member of claim 13, wherein a surface area of the permanent magnet in touching contact with the molding material constitutes less than 10% of the permanent magnet's total surface area.

15. The operating member of claim 13, wherein a surface area of the heat-conducting reinforcement in touching contact with the molding material constitutes less than 30% of the permanent magnet's total surface area.

16. The operating member of claim 13, wherein the molding material is a non-curable thermoplastic or a curable thermosetting molding material.

17. The operating member of claim 13, wherein the heat-conducting reinforcement is made from a soft magnetic material.

18. The operating member of claim 13, wherein an adhesive layer is provided between the heat-conducting reinforcement and the permanent magnet.

19. The operating member of claim 13, wherein the permanent magnet is disposed such that it forms a surface of the composite part and the heat-conducting reinforcement or the permanent magnet have an undercut in order to counteract a demolding from the composite part.

* * * * *